US008285649B2

(12) United States Patent
Ettl et al.

(10) Patent No.: US 8,285,649 B2
(45) Date of Patent: Oct. 9, 2012

(54) HEURISTIC CROSS SHIPPING OF DISASTER RELIEF SUPPLIES AT POINTS OF DISTRIBUTION

(75) Inventors: Markus Ettl, Yorktown Heights, NY (US); Soumyadip Ghosh, Yorktown Heights, NY (US); Young M. Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/565,050

(22) Filed: Sep. 23, 2009

(65) Prior Publication Data
US 2011/0071877 A1 Mar. 24, 2011

(51) Int. Cl.
*G06Q 99/00* (2006.01)
(52) U.S. Cl. ........ 705/330; 705/331; 705/332; 705/333; 705/334; 705/338
(58) Field of Classification Search ............... 705/330, 705/331–334, 338
See application file for complete search history.

(56) References Cited

U.S. PATENT DOCUMENTS

| | | | |
|---|---|---|---|
| 2003/0212494 A1* | 11/2003 | Alexander et al. ........... | 702/5 |
| 2005/0080520 A1* | 4/2005 | Kline et al. .................. | 701/1 |
| 2006/0265489 A1* | 11/2006 | Moore ........................ | 709/223 |
| 2008/0162180 A1* | 7/2008 | Johnson ...................... | 705/1 |
| 2010/0211510 A1* | 8/2010 | Foth et al. ................... | 705/305 |

FOREIGN PATENT DOCUMENTS
JP 11296606 A * 10/1999

OTHER PUBLICATIONS

Aaby et al., Montgomery County's Public Health Service Uses Operations Research to Plan Emergency Mass Dispensing and Vaccination Clinics, Interfaces, Nov.-Dec. 2006, pp. 569-579, vol. 36, No. 6.
Richter et al., Preliminary Analysis of Alternate Modes of Dispensing for LA County.
Whitworth, Designing the Response to an Anthrax Attack, Interfaces, Nov.-Dec. 2006, pp. 562-568, vol. 36, No. 6.
Lee et al., Large-Scale Dispensing for Emergency Response to Bioterrorism and Infectious-Disease Outbreak, Interfaces, Nov.-Dec. 2006, pp. 591-607, vol. 36, No. 6.
Miller et al., Responding to Bioterrorist Smallpox in San Antonio, Interfaces, Nov.-Dec. 2006, pp. 580-590, vol. 36, No. 6.
Lee et al., Simulating Distribution of Emergency Relief Supplies for Disaster Response Operations, Proceedings of the 2009 Winter Simulation Conference.

* cited by examiner

*Primary Examiner* — Akiba Allen
(74) *Attorney, Agent, or Firm* — Scully, Scott, Murphy & Presser, P.C.; Daniel P. Morris, Esq.

(57) ABSTRACT

Distributing disaster relief supplies, in one aspect, may include determining cross shipping of disaster relief supplies between points of distribution using one or more combinations of information. The information may include one or more of on-hand inventory of each point of distribution, in-transit inventory to each point of distribution, demand queue of disaster victims at each point of distribution, traveling time between supply staging area and points of distribution, traveling time between points of distribution, number of transportation vehicles available for cross shipping, minimum batch size for cross shipping, frequency of cross shipping, and point of distribution activation status, or combinations thereof.

19 Claims, 3 Drawing Sheets

US 8,285,649 B2

HEURISTIC CROSS SHIPPING OF DISASTER RELIEF SUPPLIES AT POINTS OF DISTRIBUTION

BACKGROUND

The present disclosure relates generally to distributing supplies, and more particularly to heuristic cross shipping of disaster relief supplies at points of distribution. When disasters occur (e.g., such as hurricane, earthquake, fire, bioterrorism, and others), emergency supplies (e.g., water, meal, medicine, generators, blankets, tarps, and others) need to be distributed to victims on time. The distribution operations in those situations (e.g., supply chain and dispensing) are unique because the operations need to cover a large number of people (e.g., million of victims) in a short period of time (e.g., a small number of hours or days) under undesirable conditions for supply chain operation (chaos, damaged and/or congested roadways, behavior of victims, progression of disasters, many unknowns and uncertainties, serious consequences of ineffective distribution plan, death, sickness, social disorder, and others). It is usually a one time event of short duration with limited opportunity for re-planning of upper level supply chain.

Thus, the supply chain of the relief supplies differs from commercial supply chains in many ways because the following factors need to be taken into account when planning the supply chain of the relief supplies: a huge surge of demand with a short notice, damaged and congested roadways, chaotic behavior of demand and victims, breakdown of infrastructure such as communication networks, short lead times, and other unknowns and uncertainties. Preparing for a large disaster is difficult because predicting with accuracy where and when it will strike is practically infeasible.

Shipment of emergency supplies from supply staging areas (SSA) to point of distributions (PODs) is typically carried out on round-robin fashion (i.e., one POD after another in a predetermined order) with no cross shipping among PODs. However, due to the above-described uncertainties and variability of demand at different PODs and also because of the limited supply, imbalance between demand and supply may occur among the PODs. That is, some PODs may be left with a surplus while other PODs may have a shortage.

BRIEF SUMMARY

A method and system for distributing disaster relief supplies are provided. The method in one aspect, may include determining cross shipping of disaster relief supplies between points of distribution using one or more combinations of information including at least one or more of on-hand inventory of each point of distribution, in-transit inventory to each point of distribution, demand queue of disaster victims at each point of distribution, traveling time between supply staging area and points of distribution, traveling time between points of distribution, number of transportation vehicles available for cross shipping, minimum batch size for cross shipping, frequency of cross shipping, and activation status of point of distribution.

A system for distributing disaster relief supplies, in one aspect, may include a module operable to determine cross shipping of disaster relief supplies between points of distribution using one or more combinations of information including at least one or more of on-hand inventory of each point of distribution, in-transit inventory to each point of distribution, demand queue of disaster victims at each point of distribution, traveling time between supply staging area and points of distribution, traveling time between points of distribution, number of transportation vehicles available for cross shipping, minimum batch size for cross shipping, frequency of cross shipping, and activation status of point of distribution.

A program storage device readable by a machine, tangibly embodying a program of instructions executable by the machine to perform one or more methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

In most disaster situations, demand from victims exhibits high uncertainty and variability. Disaster relief supplies may reach different POD locations at different speed and with different quantities, creating an imbalance between supply and demand. For example, certain PODs may experience shortage of supplies and certain other POD location may experience surplus during disaster response operations. A cross shipping model is presented that helps reduce the imbalance between the demand and supply and improve the effectiveness of distribution. The cross shipping (or cross leveling) model in one embodiment determines the effective cross leveling shipments (details include time to ship, origination POD, destination PODs, cross leveling quantity) by considering the following factors: estimated queues of victims in each POD, on-hand inventory, in-transit inventory to PODs, transit time (which depends on distance, road conditions and traffic), availability and capacity of cross shipping trucks, minimum shipment size for cross leveling and frequency of cross leveling, and others. Cross shipping is especially effective, for example, when the local staging area is located far away from POD location or the roadways have damages, heavy traffic, or other conditions that would prevent normal or efficient travel.

Figure 1:
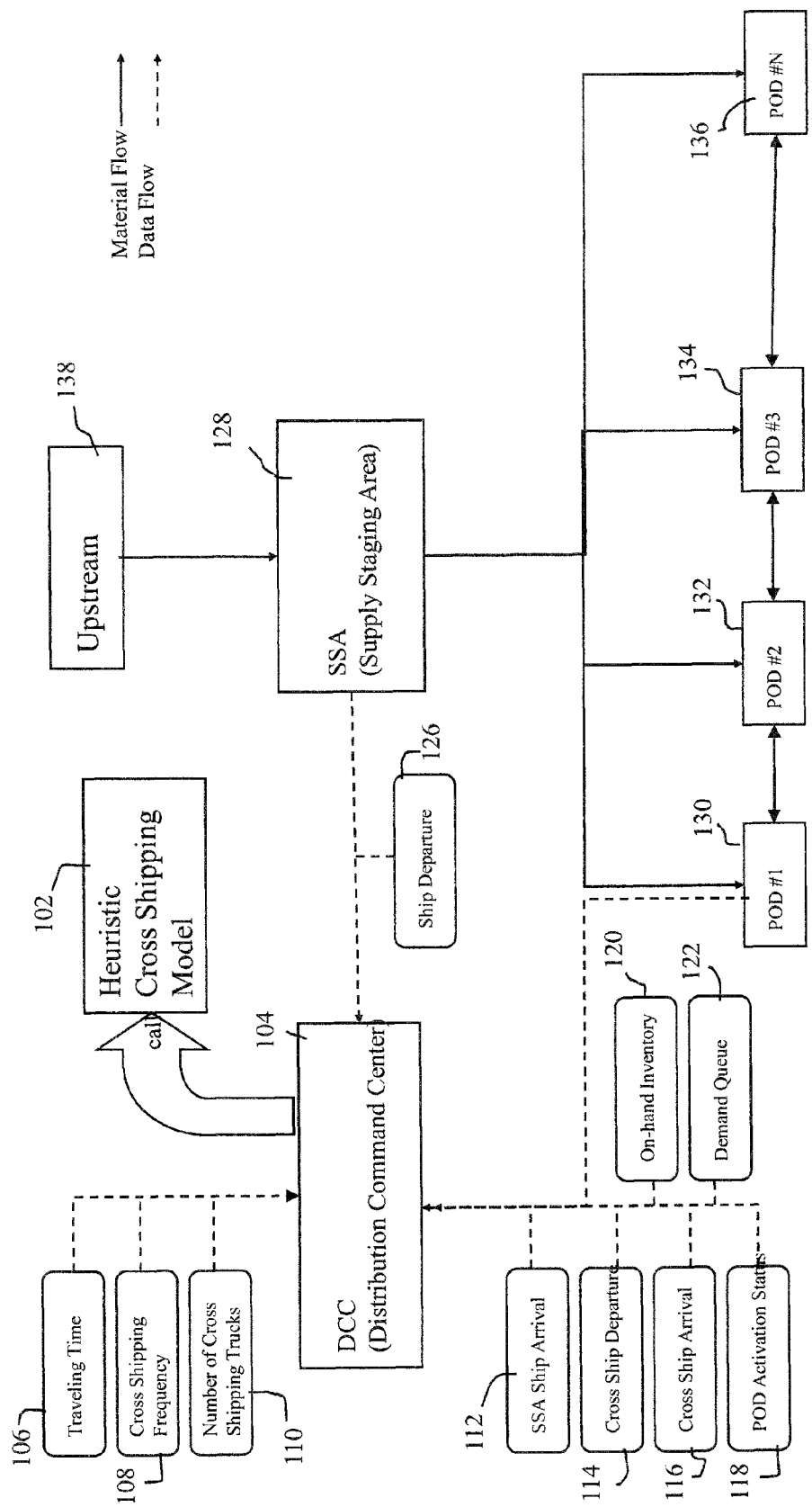
FIG. 1 is a block diagram illustration utilization of cross shipping modeler.

FIG. 1 is a block diagram illustrating utilization of cross shipping modeler in one embodiment. A heuristic cross shipping model 102 may be a computer-implemented algorithm that uses various real time data and compute an outcome which provides decisions relating to the cross shipping of supplies between points of distribution, for instance, in the presence of transient and chaotic demand of victims, early surge of supply and limited supply in later time, unpredictable shipment transit time, and others, to provide multiple commodities, timely coverage, and others. The heuristic cross shipping model 102 of the present disclosure may be a dynamic model that receives dynamically changing data and computes the supply decisions based on the changing data.

Distribution command center (DCC) 104 may be a computer system or platform that collects data from various sources, and executes or "calls" the heuristic cross shipping model 102 with the data as input to the model 102. DCC 104 collects data such as the traveling time 106 between different POD locations (e.g., 130, 132, 134, 136) and from SSA to PODs, cross shipping frequency 108, the number of available cross shipping vehicles (e.g., trucks) 110, the time of shipment arrival and quantity of shipment from a supply staging area (SSA) 112, the time of cross shipment departure, quantity, POD source and destination of cross shipments 114, the time, quantity, source and destination information related to cross ship arrival 116, POD activation status 118 relating to whether the POD is capable of distributing the supplies, on-hand inventory of each POD locations 120, and demand queue at each POD locations 122. DCC 104 may also receive data continuously or periodically from the supply staging area (SSA) 128 informing the DCC 104 of when and what commodities were sent to which POD locations by the SSA 128. SSA 128, for instance, may have received its supplies from one or more upstream sources 138.

Using the collected data, DCC 104 may execute or run the heuristic cross shipping model 102. DCC 104 may repeat the execution periodically by the cross shipping frequency or as needed with new incoming data that it collects. The heuristic cross shipping model 102 computes the cross shipping decisions as to what supplies, how many or how much of those supplies, and when the supplies should be cross shipped from which POD location to which POD location. Other information may be computed by the heuristic cross shipping model 102.

The cross shipping may be heuristically computed based on demand dynamics, transient surge, demand queue of disaster victims, POD activation status, supply dynamics, on-hand inventory of each POD, in-transit inventory to each POD, traveling time between SSA (supply staging area) and PODs, traveling time between PODs, number of truck available for cross shipping, minimum batch size for cross shipping, frequency of cross shipping, and others.

Figure 2:
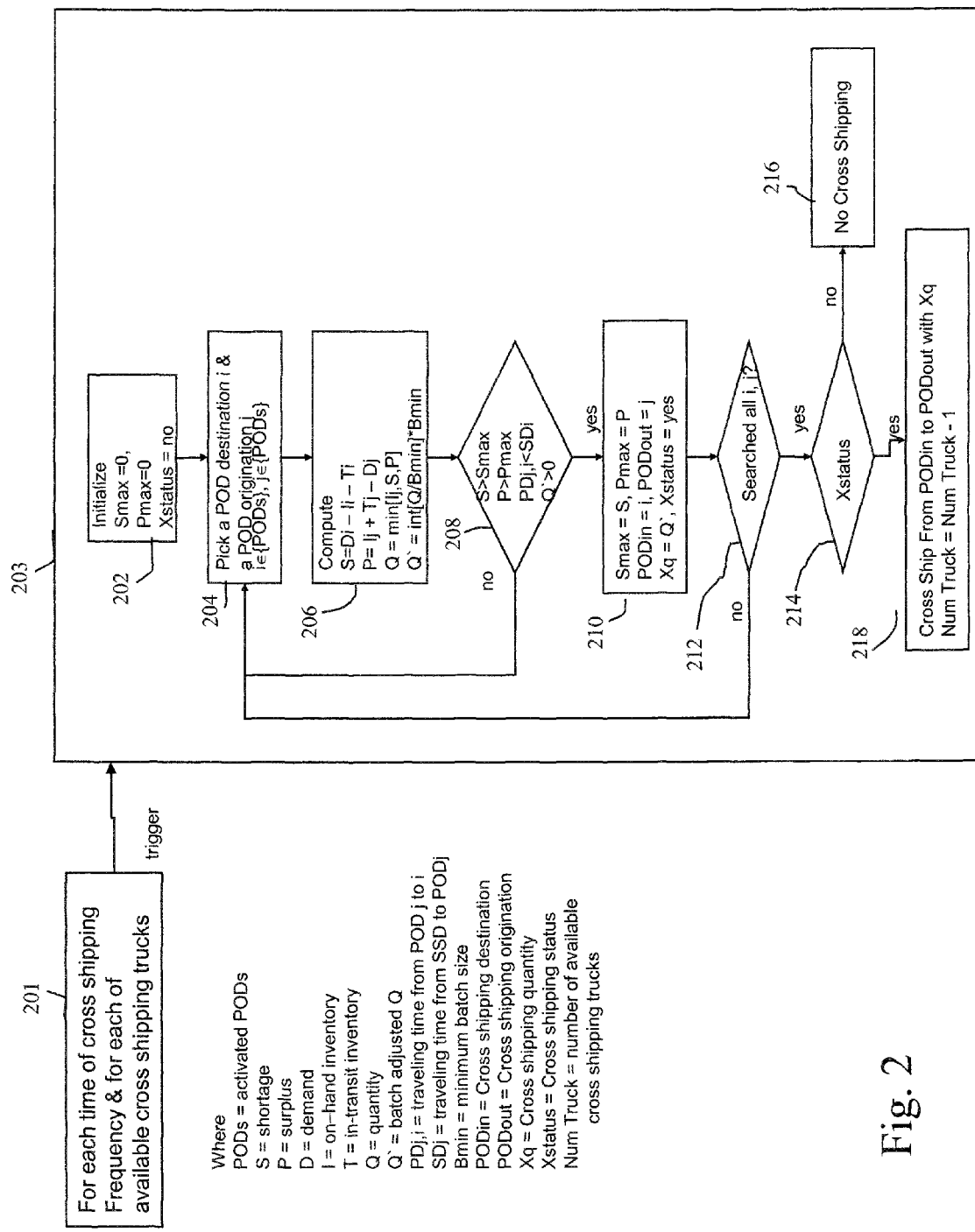
FIG. 2 illustrates a method of determining cross shipping based on heuristics.

FIG. 2 illustrates an example of algorithm that may be used for determining cross shipping based on heuristics. The cross shipping algorithm (203) may be triggered by the frequency of the cross shipping (e.g., every 6 hours if the frequency of the cross shipping is 6 hours) and for the number of time which equals the number of available of cross shipping vehicles such as trucks or the like (as shown in 201). At 202, initialization of values takes place. For instance, "Smax" representing the highest shortage in any of the POD locations is set to zero. "Pmax" representing the highest surplus value in any of the POD locations is set to zero. "Xstatus", i.e., cross shipping status is set to "no". At 204, a destination POD i and origination POD j among PODs that are active at the time are selected as candidates for cross shipping. PODs can be activated at certain time when all the resources are available for the relief operation, and they can also be deactivated due to shortage of the resources. At 206, shortage S at destination POD i is computed, for example, as demand at that location less inventory on hand at that location less in-transit inventory at that location. Inventory on hand refers to the inventory at the POD location. In-transit inventory refers to expected inventory that is in-transit expected to arrive at that POD location. In-transit inventory to each POD may be determined from shipment departure and arrival data reported for the SSA shipments to PODs and shipment departure and arrival data reported for inter-POD shipments to the distribution command center (DCC). Quantity Q is computed as minimum of inventory on hand at the origination POD j, computed shortage S, and computed surplus P. Batch adjusted quantity Q' is computed as a whole number either rounded up or down of quantity Q divided by a minimum batch size, which whole number is then multiplied by the minimum batch size.

At 208, it is determined whether all of the following conditions are met: Computed shortage S is greater that Smax previously computed, computed surplus P is greater than the previously computed Pmax, traveling time from POD j to POD i is less than the traveling time from SSD to POD j, and batch adjusted quantity is greater than zero. The traveling time is estimated by the distance and road conditions. If all of those conditions are not met, the method returns to step 204 where another set of POD destination i and POD origination j is selected as cross shipping destination and origination candidates. If the conditions at 208 are met, Smax is set to S, Pmax is set to P, PODin is set to i, and PODout is set to j. Cross shipping quantity Xq is set to Q' and cross shipping status is set to yes at 210.

At 212, if all POD destination and origination pairs have been analyzed, the method proceeds to 214. If not, the method returns to step 204 to analyze another POD destination and origination pair as candidates for cross shipping. At 214, if cross shipping status is set to yes, a recommendation is suggested to cross ship from the computed PODin to the computed PODout with the computed quantity Xq. Then the available cross shipping truck becomes one less. The cross shipping algorithm may be triggered again until all the available trucks are processed. If at 214, it is determined that cross shipping status is set to no, no cross shipping is suggested for this instance of the model run or execution.

The following pseudo-algorithm illustrates the method shown in FIG. 2.

This algorithm may be run at each time of the cross shipping frequency and for the number of times that equates the number of cross shipping vehicles such as trucks available to use for carrying and transporting the supplies.

```
Initialize:
Smax = 0;
Pmax = 0;
Xstatus = no.
Select a POD destination i, a POD origination j, where i ∈ {PODs} and j
∈ {PODs}.
Compute:
S = Di – Ii – Ti;
P = Ij + Tj – Dj;
Q = min [Ij, S, P];
Q' = int [Q/Bmin] * Bin.
    If S > Smax or P > Pmax or PDj, i < SDi or Q > 0 then
    set Smax = S; Pmax = P; PODin = i; PODout = j; Xq = Q'; Xstatus =
    yes;
    if all i's and j's have not been searched the
        go back to selecting POD destination i, a POD origination j;
else
    go back to selecting POD destination i, a POD origination j.
    If Xstatus is yes then
    provide recommendation to cross ship from PODin to PODout;
else
    no cross shipping is recommended.
```

The following notations are used in the above-described algorithm:
PODs=activated PODs
S=shortage
P=surplus
D=demand
I=on-hand inventory
T=in-transit inventory
Q=quantity
Q'=batch adjusted Q
PDj,i=distance from POD j to i SDj=distance from SSD to PODj
Bmin=minimum batch size
PODin=Cross shipping destination
PODout=Cross shipping origination
Xq=Cross shipping quantity
Xstatus=Cross shipping status
Num Truck=number of available cross shipping trucks The above algorithm is described as an example only and thus the invention is not limited to using only that algorithm. Other algorithm using one or more or different combination of dynamic parameters such as those described above, may be utilized to provide cross shipping decisions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
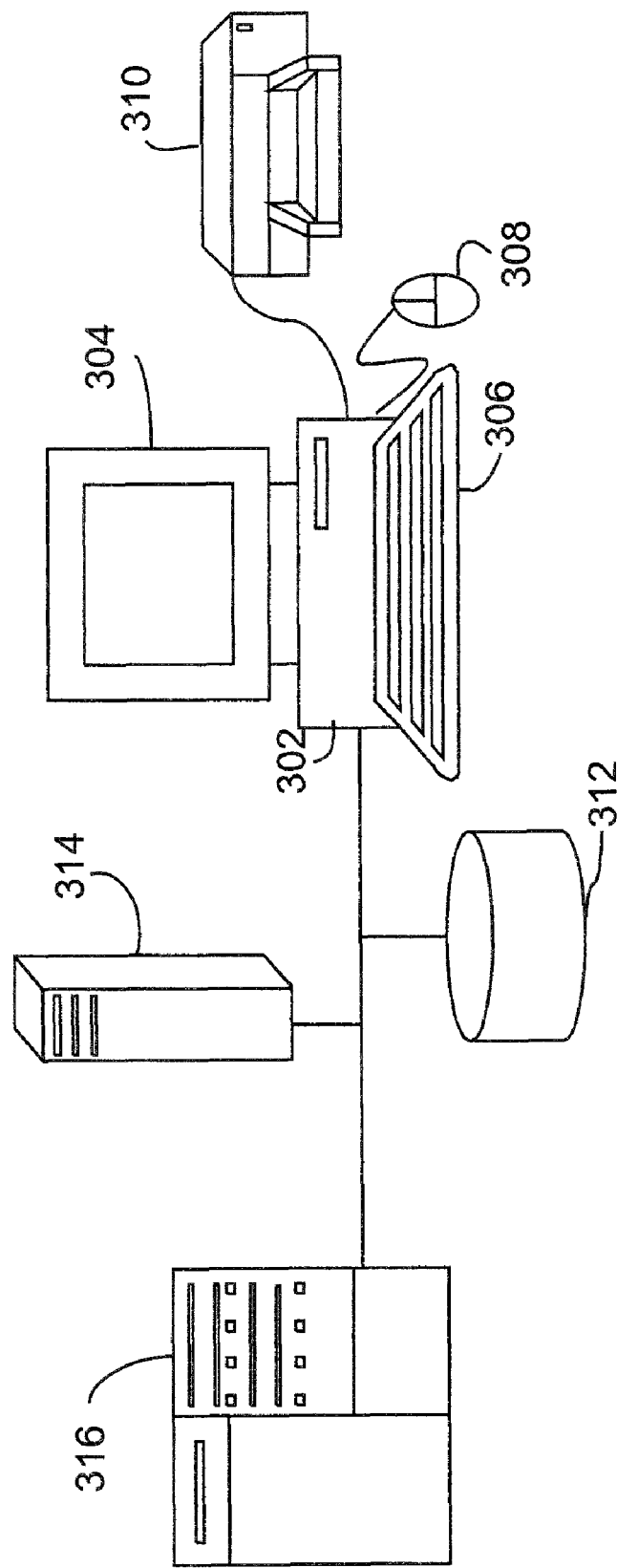
FIG. 3 illustrates an example of a computer system, in which the systems and methodologies of the present disclosure may be carried out or executed.

Referring now to FIG. 3, the systems and methodologies of the present disclosure may be carried out or executed in a computer system that includes a processing unit 302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 316), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of determining cross shipping availability of disaster relief supplies between points of distribution, comprising:

selecting by a processor a candidate destination point of distribution and a candidate origination point of distribution from the points of distribution, each of the points of distribution designated for meeting demand from victims;

computing by a processor shortage of the disaster relief supplies at the candidate destination point of distribution;

computing by a processor surplus of the disaster relief supplies at the candidate origination point of distribution;

computing by a processer quantity for distribution to minimum of inventory on hand at the candidate origination point of distribution, the computed shortage and the computed surplus;

determining by a processor travel time between the candidate origination point of distribution and the candidate destination point of distribution;

determining by a processor travel time between a supply staging area and the candidate destination point of distribution;

if the computed shortage is greater than a previously computed shortage, the computed surplus is greater than a previously computed surplus, the travel time between the candidate origination point of distribution and the candidate destination point of distribution is less than the travel time between a supply staging area and the destination point of distribution, then setting by a processor cross shipping status between the candidate destination point of distribution and the candidate origination point of distribution to affirmative;

repeating the selecting, the computing shortage, the computing surplus, the computing quantity, the determining travel time between the candidate origination point of distribution and the candidate destination point of distribution, and the determining travel time between a supply staging area and the candidate destination point of distribution until all of the points of distribution have been selected as candidates, wherein information including at least on-hand inventory of each point of distribution, in-transit inventory to each point of distribution, demand queue of disaster victims at each point of distribution, traveling time between supply staging area and the points of distribution, traveling time between the points of distribution, and number of transportation vehicles available for cross shipping is considered for determining cross shipping availability between the one or more pairs of distribution points.

2. The method of claim 1, wherein the information includes dynamically changing information, and the cross shipping of disaster relief supplies between points of distribution is determined dynamically.

3. The method of claim 1, wherein the cross shipping for each opportunity of cross shipping is determined by identifying a destination point of distribution with most shortage, an origination point of distribution with most surplus, and cross shipping quantity which is the minimum of the surplus, shortage and origination inventory, and a multiple of minimum batch size of cross shipping at time of the cross shipping opportunity.

4. The method of claim 1, wherein the in-transit inventory to each point of distribution is computed from shipment departure data from supply staging area to point of distribution and shipment departure and arrival data from a point of distribution to another point of distribution.

5. The method of claim 4, wherein the information associated with the on-hand inventory, the demand queue, the POD activation status, supply staging area shipment departure time, POD cross shipment departure time, and POD cross shipment arrival time is received dynamically.

6. A system for determining cross shipping availability of disaster relief supplies between points of distribution, comprising:
a computer processor;
a module executing on the computer processor and operable to select a candidate destination point of distribution and a candidate origination point of distribution from the points of distribution, each of the points of distribution designated for meeting demand from victims, compute shortage of the disaster relief supplies at the candidate destination point of distribution, compute surplus of the disaster relief supplies at the candidate origination point of distribution, the module further operable to compute quantity for distribution to minimum of inventory on hand at the candidate origination point of distribution, the computed shortage and the computed surplus, the module further operable to determine travel time between the candidate origination point of distribution and the candidate destination point of distribution, determine travel time between a supply staging area to the candidate destination point of distribution, and if the computed shortage is greater than a previously computed shortage, the computed surplus is greater than a previously computed surplus, the travel time between the candidate origination point of distribution and the candidate destination point of distribution is less than the travel time between a supply staging area and the destination point of distribution, then set cross shipping status between the candidate destination point of distribution and the candidate origination point of distribution to affirmative, the module further operable to repeat the selecting, the computing shortage, the computing surplus, the computing quantity, the determining travel time between the candidate origination point of distribution and the candidate destination point of distribution, and the determining travel time between a supply staging area and the candidate destination point of distribution until all of the points of distribution have been selected as candidates, wherein information including at least on-hand inventory of each point of distribution, in-transit inventory to each point of distribution, demand queue of disaster victims at each point of distribution, traveling time between supply staging area and the points of distribution, traveling time between the points of distribution, and number of transportation vehicles available for cross shipping is considered for determining cross shipping availability between the one or more pairs of distribution points.

7. The system of claim 6, wherein the information includes dynamically changing information, and the cross shipping of disaster relief supplies between points of distribution is determined dynamically.

8. The system of claim 6, wherein the module for each opportunity of cross shipping determines cross shipping by identifying a destination point of distribution with most shortage, an origination point of distribution with most surplus, and cross shipping quantity which is the minimum of the surplus, shortage and origination inventory, and a multiple of minimum batch size of cross shipping at time of the cross shipping opportunity.

9. The system of claim 6, wherein the in-transit inventory to each point of distribution is computed from shipment departure data from supply staging area to point of distribution and shipment departure and arrival data at points of distribution.

10. The system of claim 9, wherein the information associated with the on-hand inventory, the demand queue, the point of distribution activation status, supply staging area shipment departure time, point of distribution cross shipment departure time, and point of distribution cross shipment arrival time is received from one or more points of distribution dynamically.

11. A program storage device readable by a machine, tangibly embodying a program of instructions executable by the machine to perform a method of determining cross shipping availability of disaster relief supplies between points of distribution, comprising:
selecting a candidate destination point of distribution and a candidate origination point of distribution from the points of distribution, each of the points of distribution designated for meeting demand from victims;
computing shortage of the disaster relief supplies at the candidate destination point of distribution;

computing surplus of the disaster relief supplies at the candidate origination point of distribution;

computing quantity for distribution to minimum of inventory on hand at the candidate origination point of distribution, the computed shortage and the computed surplus;

determining travel time between the candidate origination point of distribution and the candidate destination point of distribution;

determining travel time between a supply staging area and the candidate destination point of distribution;

if the computed shortage is greater than a previously computed shortage, the computed surplus is greater than a previously computed surplus, the travel time between the candidate origination point of distribution and the candidate destination point of distribution is less than the travel time between a supply staging area and the candidate destination point of distribution, then setting cross shipping status between the candidate destination point of distribution and the candidate origination point of distribution to affirmative;

repeating the selecting, the computing shortage, the computing surplus, the computing quantity, the determining travel time between the candidate origination point of distribution and the candidate destination point of distribution, and the determining travel time between a supply staging area and the candidate destination point of distribution until all of the points of distribution have been selected as candidates, wherein information including at least on-hand inventory of each point of distribution, in-transit inventory to each point of distribution, demand queue of disaster victims at each point of distribution, traveling time between supply staging area and the points of distribution, traveling time between the points of distribution, and number of transportation vehicles available for cross shipping is considered for determining cross shipping availability between the one or more pairs of distribution points.

12. The program storage device of claim 11, wherein the information includes dynamically changing information, and the cross shipping of disaster relief supplies between points of distribution is determined dynamically.

13. The program storage device of claim 11, wherein the cross shipping for each opportunity of cross shipping is determined by identifying a destination point of distribution with most shortage, an origination point of distribution with most surplus, and cross shipping quantity which is the minimum of the surplus, shortage and origination inventory, and a multiple of minimum batch size of cross shipping at time of the cross shipping opportunity.

14. The program storage device of claim 11, wherein the in-transit inventory to each point of distribution is computed from shipment departure from supply staging area to points of distribution and shipment departure and arrival data from a point of distribution to another point of distribution.

15. The method of claim 1, further including: performing the method for a number of times equal to a number of cross shipping vehicles that are available for transporting the disaster relief supplies.

16. The method of claim 1, wherein the information further includes minimum batch size for cross shipping, frequency of cross shipping, and activation status of point of distribution.

17. The system of claim 6, wherein the information further includes minimum batch size for cross shipping, frequency of cross shipping, and activation status of point of distribution.

18. The program storage device of claim 11, wherein the information further includes minimum batch size for cross shipping, frequency of cross shipping, and activation status of point of distribution.

19. The program storage device of claim 15, wherein the information associated with the on-hand inventory, the demand queue, the POD activation time, supply staging area shipment arrival status, POD cross shipment departure time, and POD cross shipment arrival time is received from one or more points of distribution dynamically.

* * * * *